United States Patent Office 3,498,332
Patented Mar. 3, 1970

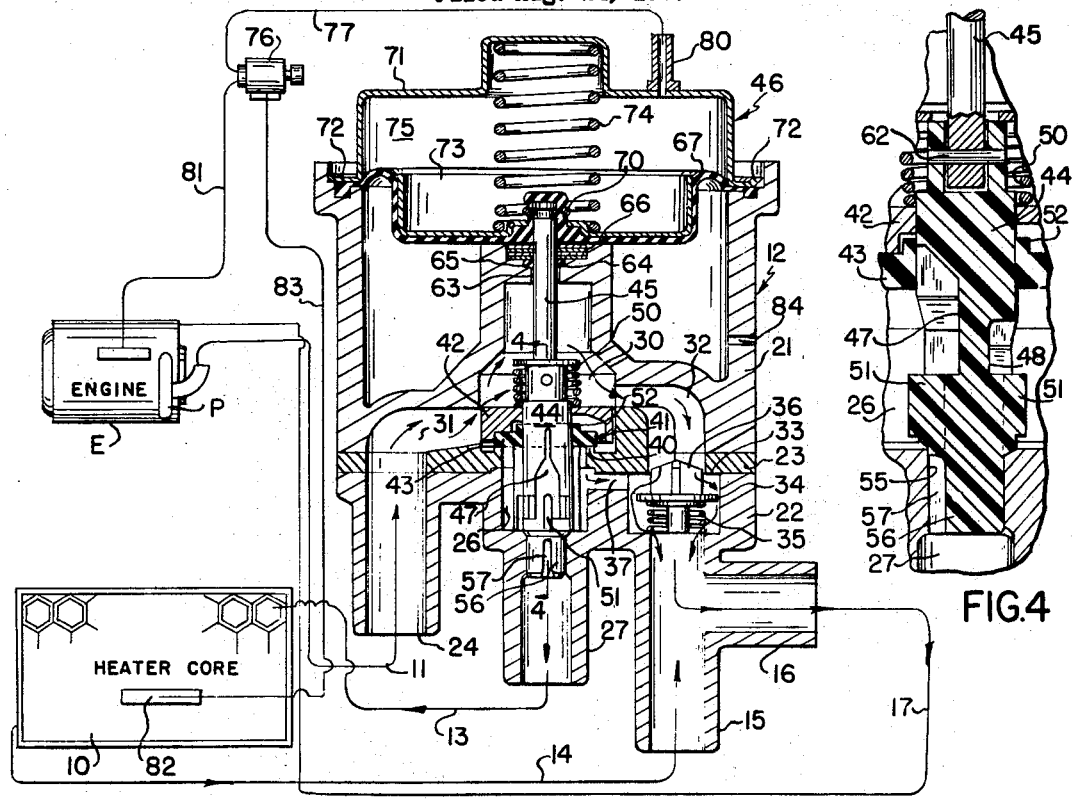

3,498,332
LIQUID FLOW CONTROL VALVE
Arnold T. Lybrook, Lancaster, Ohio, assignor to Ranco Incorporated, Columbus, Ohio, a corporation of Ohio
Filed Aug. 24, 1967, Ser. No. 663,138
Int. Cl. F16k *31/145;* F17d *3/00*
U.S. Cl. 137—630.14                          4 Claims

ABSTRACT OF THE DISCLOSURE

A valve body has a chamber therein with a liquid inlet at one side, a liquid outlet at another side and at a different level, and an outlet port at one end. A valve assembly is moved relative to the port to control the flow of liquid therethrough and when in the flow restricting position, is also adapted to partially block the flow of liquid into the chamber through the inlet opening and when the assembly is in a position to permit relatively unrestricted flow through the outlet port, it is effective to partially block flow of liquid from the chamber through the outlet opening in the side of the chamber. The valve assembly comprises an annular valve closure with a plunger adapted to slide through the central opening and the plunger has a recess in a side thereof which is more or less exposed to opposite sides of the closure member, according to the position of the plunger, to modulate the flow of liquid through the outlet port. The plunger is effective to raise the valve member from its seat when it is moved a predetermined distance in its flow increasing direction.

---

The present invention relates to improvements in liquid flow control valves adapted to provide relatively constant selected volumes of flow of liquid through a flow circuit in which the pressure of the liquid in the circuit varies throughout a considerable range. The invention is particularly useful in valves for controlling the flow of heated liquid of an internal combustion engine cooling system through a heater core for heating the interior of the passenger compartment of an automobile.

It has been the practice to heat the interior of a passenger compartment of an automobile and the like by circulating the heated liquid from the cooling system of the engine for the automobile through a heater core arranged in a heating system in which air is passed through the heater core to absorb heat from the heated liquid passing therethrough, the heated air being discharged into the passenger compartment. It is desirable to regulate the flow of heated fluid through the heater core by a valve mechanism which can be manually adjustable to regulate the temperature of the air discharging from the heater core and thereby regulate the temperature inside the passenger compartment. Because the liquid is circulated by a pump driven by the automobile engine the pressure and rate at which the liquid is circulated through the heater core varies according to changes in speed of the engine and the heat output of the heater core therefore varies widely and results in over and underheating and, for that reason, this type of control has proved to be unsatisfactory. In addition, present day cooling systems for automobile internal combustion engines are usually operated at relatively high pressures which present problems in providing valves which are unaffected by these pressures, particularly where the valve is actuated by a thermally responsive element.

Another difficulty encountered in controlling the flow of liquid in automobile heater systems is that particles of matter in the systems tend to clog the valve parts when the valves are throttled to provide a relatively low rate of flow in the system and therefore the valves are ineffective.

The principal object of the present invention is the provision of a new and improved regulatable liquid flow control valve of the type mentioned, and which comprises a relatively compact valve body having a fluid inlet and outlet at one end and a vacuum motor for operating valve at the other end.

More specifically, an object of the invention is the provision of a new and improved valve mechanism of the character mentioned which comprises a valve body having a valve chamber with an inlet at one side, and outlet at a side at a different level from the inlet and an outlet valve port or seat at one end of the chamber, a valve member or assembly movable to and from the valve port and adapted to more or less block the inlet opening when the valve assembly is on or in proximity to the port and when moved substantially from the valve port to be removed from the inlet opening to permit free flow of fluid into the chamber and at the same time be in a position to appreciably block the opening of the outlet in the side of the chamber so as to inhibit the flow of fluid through the outlet opening and provide ample flow of fluid through the port.

The invention further contemplates the provisions of a new and improved valve of the character mentioned in which the valve assembly comprises an annular valve port closure member and a plunger type valve member slidable axially through the circular valve member and having a recess in the plunger adapted to be exposed to areas on opposite sides of the annular valve port closure member as the plunger is shifted relative to the annular valve member for modulating the flow of fluid through the valve port, the plunger being adapted to engage and move the annular valve member from the port when the plunger valve member is moved to one end of its maximum flow rate position, and means to maintain the annular valve member to the port during sliding movements of the plunger valve member to modulate the flow through the port.

Other objects and advantages of the invention will be apparent from the following description of a preferred form thereof, reference being made to the accompanying drawings wherein:

FIG. 1 is a schematic view of a heating system for the interior of a passenger automobile and showing a sectional view of a valve embodying the invention located in the system;

FIGS. 2 and 3 are fragmentary sectional views of the valve shown in FIG. 1 showing certain parts in different positions; and FIG. 4 is a fragmentary sectional view of the valve taken substantially on line 4—4 of FIG. 1, and on a larger scale.

Referring to the drawings, a heating system for the passenger compartment of an automobile is shown, which system comprises a conventional heater core 10 through which the liquid coolant of the cooling system of the automobile engine E is circulated and through which air is directed and discharged into the passenger compartment. Such heating systems are well known and for the sake of brevity, the passenger compartment and air circulating means are not shown. Suffice to say, a pump P, driven by the engine E, directs liquid from the cooling jacket of the engine through a conduit 11 to a control valve 12 from whence the liquid is directed to the heater core 10 from the valve through a conduit 13. Liquid passed through the heater core 10 is returned to the cooling system of the engine through a conduit 14, valve ports 15, 16, and conduit 17. The valve 12 is operative to bypass all or a part of the liquid around the heater core 10, according to the air heating requirements, through port 16 and conduit 17 back to the engine.

The valve mechanism 12 comprises a body 20 formed of two cylindrical molded parts 21, 22 suitably secured together with an intermediate body member 23 therebetween. The part 22 of the body 20 has a tubular inlet port or conduit connector 24 and an outlet port or conduit connector 16 formed thereon to which connectors and conduits 11 and 17 leading from the discharge of the pump P and the engine cooling jacket, respectively, are connected. A central passage 26 in the body parts 22, 23 leads to a port or conduit connector 27 to which one end of the conduit 13 is attached for directing liquid to the inlet of the heater core 10. The port 15 formed on the body part 22 communicates with the connector 16 and one end of the conduit 14 is connected therewith to receive fluid discharged from the heater core 10.

The passage 26 leads downwardly, as viewed in the drawings, from a domed chamber 30 into which fluid is adapted to flow from the connector 24 through a passage 31. Fluid exits the chamber 30 through the passage 26 and connector 16 or, alternatively, through a passage 32, formed in the body parts 21, 23, 22 and the connector 16.

A check valve is provided between the passage 32 and connector 16 and comprises a valve seat 33 adapted to be closed by a poppet valve member 34 which is urged to the seat by a spring 35. The force of the spring 35 is such as to permit opening of the valve member 34 from its seat when the pressure of the fluid in the chamber 30 exceeds 1½ p.s.i., for example. The valve member 34 includes guide flanges 36 which cooperate with the walls of the passage 32 to guide the valve member relative to its seat.

A bypass passage 37 is formed between the passage 26 and the passage 32 downstream of the valve member 34.

A valve seat or port 40 is formed about the upper end of the passage 26 and an annular valve assembly 41 is adapted to close on the port. The valve assembly 41 is formed of an annular disc shaped rigid backing member 42 having a recess which receives an annular resilient seat member 43. A valve plunger 44 is slidingly received through the assembly 41 and the materials of the valve member 43 and plunger 44 are relatively resilient and of low friction so that a substantially leak-proof sliding seal is provided between the engaging surfaces thereof. The plunger 44 has an operating stem 45 attached to the upper end thereof which projects through an opening in the top of chamber 30 and is attached to the driver of a vacuum motor 46. The motor 46 moves the plunger 44 longitudinally in the valve assembly 41 to expose more or less of flow passages 47, 48, formed by recesses in the side surfaces of the plunger, to the liquid in the chamber 30 so as to provide a modulated, relatively low rate of flow through the valve seat 40, as is explained hereinafter.

The valve assembly 41 is urged towards the valve seat 40 by a compression spring 50 which surrounds the upper portion of the plunger 44 and having one end abutting a flange about the upper end of the plunger and the other end bearing against the valve assembly 41 so as to urge the valve assembly towards the seat. Four radially projecting ridges 51 formed on the lower portion of the plunger 44 and spaced at 90° to one another engage the underside of the valve assembly 41 and lift the valve assembly from the seat 40 when the plunger is moved upwardly a given distance, as viewed in the drawings.

The recess 47 is generally bottle-shaped and forms a fluid passage from the chamber 30 through the central opening in the valve assembly 41 and into the passage 26 while the valve assembly rests on the seat 40. The top edge of the valve member 43 has an upstanding annular lip 52 around the central opening therethrough which, because of the flexible nature of the material forming the member, is pressed against and forms a fluid tight seal with the cylindrical surfaces of the plunger 44.

The form of the portion of the chamber 30 in which valve back-up member 42 moves comprises sections of a cylinder at the openings of the passages 31 and 32 into the chamber and the chamber walls intermediate these sections are preferably elliptical or oval so as to provide ample fluid passages substantially surrounding the valve assembly 41 by which liquid may flow to the upper portion of recess 47 when the valve assembly 41 is on the seat 40. When the plunger 44 is in its lowermost position, as seen in FIG. 1, the upper end of the recess 47 is below the seal 52 and no fluid can flow through or around the valve assembly and into the passage 26. As the plunger 44 is moved upwardly, the valve assembly 41 remains closed on the seat 40 by force of the spring 50 and the recess 47 becomes exposed to the fluid in chamber 30 above the seal 52. Thus, fluid commences to flow into the upper end of the recess 47 and exits into the passage 26 below the valve seat 40. The cross sectional area of the recess 47 increases from the upper to the midsection thereof so that the movement of the plunger 44 described provides modulation in the flow of fluid through the recess according to the axial position of the plunger relative to the seal 52. The upward movement of the plunger 44 causes a corresponding increase in the flow of fluid through the recesses 47, 48 and after the maximum width of the recesses has moved above the seal 52, the ridges 51 engage the underside of the valve assembly 41 and remove the valve assembly from its seat 40 thereby exposing the entire seat to fluid in the chamber 30. This condition is illustrated in FIGS. 2 and 3 and results in a maximum flow of fluid into the passage 26.

The lower portion 56 of the plunger 44 enters a reduced diameter section 55 of the passage 26 as the plunger is moved to a position in which the valve assembly 41 engages the seat 40 and substantially blocks the passage section. The portion 56 of the plunger 44, however, has a recess 57 in one side thereof which forms an inverted funnel shaped passageway from the upper passage 26 into the section 55. The recess 57 flares towards the bottom of the plunger 44 so as to increase the size of the fluid passageway formed thereby as the plunger moves upwardly and the volume of flow through the recess 47 increases. The recess 57 somewhat restricts the flow of liquid into the passage section 55 so as to cause diversion of some fluid through the bypass 37 which the portion 56 of the plunger is the passage section 26. To provide for an adequate increase in flow of fluid to the passage 26 as the plunger 44 is moved upwardly, the second recess 48 is provided in the side of the plunger opposite that in which the recess 47 is formed.

As mentioned previously, the ridges 51 on the plunger 44 engage and raise the valve assembly 41 from its seat 40 to provide for maximum flow of fluid as the plunger is raised to its greatest height at which time the portion 56 of the plunger has been removed from the passage 26 to fully open the latter.

The recesses 47, 48 are dimensioned so that they will pass relatively large particles at its minimum flow position. A portion of the fluid passing through the recess 47 to the passage 26 is diverted from the latter passage through the passage 37 to the passage 32 and back to the engine E through the outlet 16 and the conduit 17. Thus, the flow of fluid to the heater core 10 through the valve outlet 27 and conduit 13 will be appreciably less than the flow through the recesses 47 and 57 thereby providing a low rate of heat exchange while the valve parts are open sufficiently to prevent clogging thereof.

As mentioned previously, the valve member 42 fits somewhat loosely in the section of the chamber 30, and when the valve assembly 41 is in its lowermost position, the member 42 blocks a substantial portion of the opening of the passage 31 into the chamber 30 so as to restrict the flow of liquid from the pump P into the chamber during low flow positioning of the plunger 44. This blockage, in conjunction with the pressure responsive valve member 34, reduces the tendency to effect an increase in flow rate through the valve and heater core as the engine speed increases and thereby provides a substantially constant flow rate under varying pump speeds. As the plunger 44 is moved towards the maximum flow position and the valve assembly 41 is raised from its seat 40, the member 42 tends to block the outlet passage 32 and thereby cause the majority of the liquid entering the chamber to be directed into the passage 26, now open at the seat 40.

The operating stem 45 for the plunger 44 is secured to the upper end of the plunger by a pin 62, and the upper end of the stem extends through a guide opening 63 in the top wall of the chamber 30. A slide seal means 64 comprising an O-ring surrounds the stem 45 and is secured in an annular recess 65 by clamp washers 66. The upper end portion of the stem 45 extends into a socket formed at the center of a flexible diaphragm 67, and a wire clamp 70 crowds material of the socket into a groove about the stem, as shown, to provide a firm connection between the stem and diaphragm. The diaphragm 67 has a peripheral head which is sealingly clamped in an annular groove formed about the top end edge of the body member 21 by the edges of a dome-shaped cover member 71. The cover 71 is secured in place by ratchet-like teeth 72 formed about the open end edges thereof and which dig into the sides of the groove, as shown. A cup-shaped backing member 73 overlies the central portion of the diaphragm 67, and a compression spring 74 having one end located in a recess in the cover 71, engages the backing member to urge the diaphragm and stem 45 downwardly.

The diaphragm 67 and cover 71 form an air-tight chamber 75 which is in communication with a vacuum regulator 76 through a conduit 77 one end of which is attached to a stem 80 formed on the cover 71 and opening into the chamber 75. The regulator 76 may be of any suitable construction which is connected with the intake manifold of the engine E through a conduit 81 and provides a vacuum in the conduit 77 and chamber 75 which corresponds to the temperature of air discharging from the heater core 10. A suitable regulator is disclosed in U.S. Patent No. 3,371,864, and it includes a liquid filled bulb 82 disposed in the air discharge from the heater core and connected with an expansible element by a capillary tube 83. Thus, the pressure inside the chamber 75 will correspond to the temperature of the air discharging from the heater core 10 by action of the regulator 76. The walls of the body member 21 have one or more openings 84 beneath the diaphragm 67 to admit atmosphere into the chamber and provide pressure for moving the diaphragm upwardly against the action of the spring 74 as the vacuum above the diaphragm increases.

It will be seen that changes in pressures of the liquid within the cooling system for the engine E will have no appreciable effect on the positioning of the valve parts 41, 44, and that changes in the rate of flow of liquid will have little if no effect on rate of flow of liquid to the heater core 10 for any given position of the plunger 45. The valve 34 relieves all excessive liquid pressures in the valve chamber 30 and the operation of the valve member 42 relative to the inlet passage 31 and the outlet passage 32 serves to minimize or eliminate adverse effects of increases in rates of flow of liquid into the valve mechanism.

It is apparent that the invention provides valve means which accurately controls the flow of fluid over a wide range of rate of flow and is not adversely affected by changes in fluid pressure or usual particles of dirt, etc. in the system.

Having described my invention, I claim:

1. A valve mechanism comprising means forming a valve chamber, a fluid inlet passage opening into said chamber at one level, a first outlet passage having an opening in said chamber at a second level, a second outlet comprising a port at one end of said chamber, valve means adapted to move to and from said port to close and open said second outlet respectively and having a first portion thereof extending so as to block a substantial area of said inlet opening when said valve means is on said port and to move from blocking the opening as said valve means moves from said port, said valve means having a second portion thereof adapted to move across and tend to block the opening of said first outlet when said valve means moves from said seat and to move from tending to block said first outlet when said valve means is moved to said port.

2. A valve mechanism as defined in claim 1 further characterized by said valve means comprising an annular member for engaging said port and a plunger movable in the opening through said annular member, said plunger having an aperture therein extending lengthwise of said plunger a greater distance than the longitudinal extent of said annular member and being more or less exposed to opposite sides of said annular member and said chamber according to the position of said plunger relative to said annular member, and means for moving said plunger axially to position said aperture more or less into said chamber.

3. A valve mechanism according to claim 2 further characterized by said plunger and annular member having parts which interengage when said plunger is moved in a direction away from said port to expose a substantial area of said aperture to said chamber and to thereby remove said annular member from said port.

4. A valve mechanism as defined in claim 3 further characterized by a spring interposed between said plunger and annular valve member and urging said annular valve member toward said port.

References Cited

UNITED STATES PATENTS

| | | | |
|---|---|---|---|
| 1,993,195 | 3/1935 | Temple | 137—599.1 XR |
| 2,486,608 | 11/1949 | MacDougall | 137—599.1 XR |
| 2,618,291 | 11/1952 | Yestre | 137—599.1 |
| 2,653,626 | 9/1953 | Finlayson | 137—599.2 |
| 2,658,523 | 11/1953 | Johnson | 251—118 XR |
| 2,737,199 | 3/1956 | Ingram | 137—599.1 XR |
| 2,920,653 | 1/1960 | Wolff | 137—599.1 XR |
| 2,922,439 | 1/1960 | Palmer | 137—599.1 |
| 3,025,881 | 3/1962 | Freeman | 137—609 XR |
| 3,364,948 | 1/1968 | Seiffert | 137—609 XR |

ROBERT G. NILSON, Primary Examiner

U.S. Cl. X.R.
137—599.2, 625.49